Dec. 24, 1940.        G. WHITE        2,225,729
METHOD OF COLORING VITREOUS ARTICLES
Filed April 29, 1938
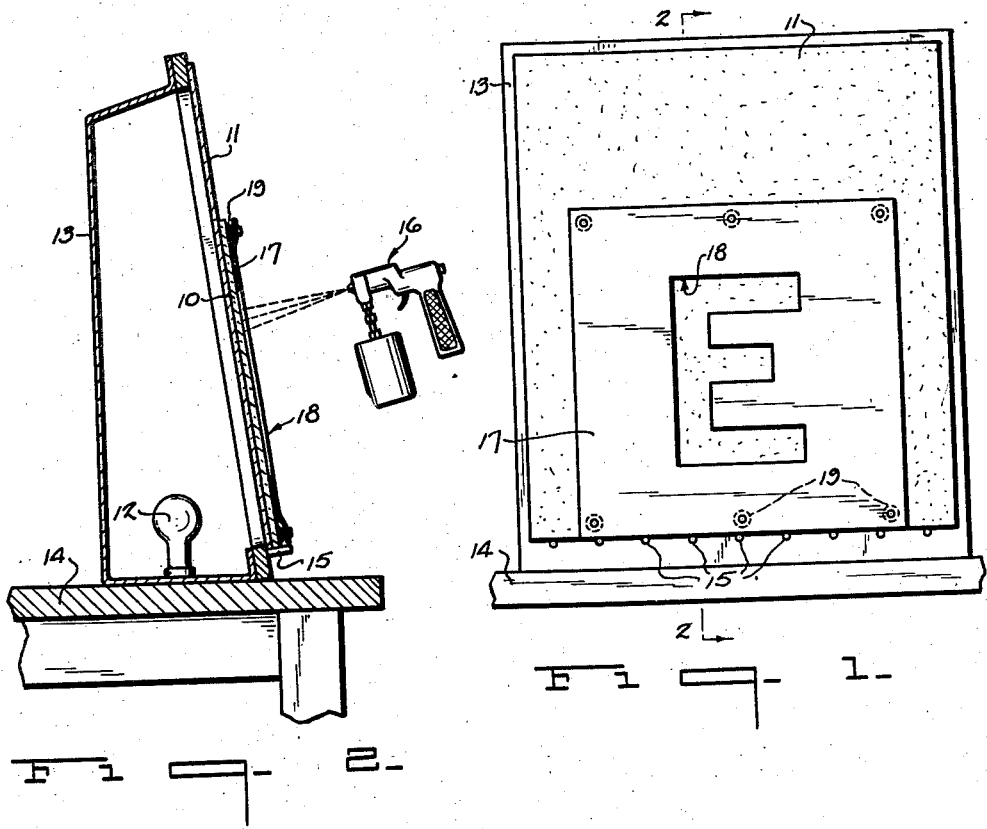
Inventor
GERALD WHITE.
By Frank Fraser,
Attorney Patented Dec. 24, 1940

2,225,729

UNITED STATES PATENT OFFICE 2,225,729

METHOD OF COLORING VITREOUS ARTICLES

Gerald White, Toledo, Ohio, assignor to Libbey-Owens-Ford Glass Company, Toledo, Ohio, a corporation of Ohio Application April 29, 1938, Serial No. 205,116

7 Claims. (Cl. 41—29)

The present invention relates broadly to the manufacture of colored vitreous articles and more particularly to a novel method of applying a plurality of colors to a glass or similar vitreous surface.

An important object of the invention is the provision of an improved method primarily adapted for the formation of multicolored signs, designs, or patterns on glass sheets or plates or other glass articles and wherein a plurality of colors may be successively applied to the glass surface and subsequently baked or fired thereupon in a single heat treatment.

Another important object of the invention is the provision of an improved method of producing multicolored signs, designs, or patterns on glass sheets or plates or other glass articles wherein the first color applied to the glass surface is covered with a temporary protective coating to protect the said color during the application of the second color and which temporary protective coating is allowed to remain upon the glass during the baking or firing of the colors thereon, after which it may be readily removed.

Other objects and advantages of the invention will become more apparent during the course of the following description, when taken in connection with the accompanying drawing.

In the drawing, wherein like numerals are employed to designate like parts throughout the same:

Fig. 1 is a front elevation of one form of apparatus which may be employed in carrying out the present invention;

Fig. 2 is a vertical sectional view taken substantially on line 2—2 of Fig 1; and Fig. 3 is a vertical longitudinal section showing one type of apparatus in which the baking or firing of the colors upon the glass may be accomplished and also means for subsequently removing the temporary coating from the glass.

Although the invention is not restricted to the coloring of glass sheets or plates or any specific type of glass or other vitreous articles or to the formation thereupon of any specified advertising or decorative matter, it is of especial utility in the making of multicolored signs upon glass sheets or plates and will be specifically described, by way of example, in this connection although the application of the method to other vitreous articles and to form other designs, patterns, etc., will be readily apparent.

In coloring glass sheets to produce multicolored signs, it is preferable to first cut the sheet to size and edge the same, after which the surface of the said sheet which is adapted to receive the coloring material is thoroughly cleaned and this is important since, if the glass is not clean and free from all oil and grease, it will not "take" the coloring material. The glass may first be cleaned with a suitable washing powder or a similar preparation to remove water-marks, grease, etc., after which it is preferably washed with a 50% alcohol solution; that is, a solution of equal parts of alcohol and water, the water being added to reduce the speed of evaporation of the solution.

After the sheet has been properly cleaned, it is ready for coloring and to facilitate the application of the coloring material thereto, the said sheet is preferably supported in a substantially vertical position against a lighted background. As illustrated in Figs. 1 and 2 of the drawing, the glass sheet 10 to be colored is supported in a substantially vertical position against a lighted background 11 which consists of a relatively large sheet of glass, one surface of which is sand-blasted or otherwise treated in order to diffuse the light directed upon the rear surface thereof from one or a number of electric lamps 12 mounted in a casing 13 which is supported upon a table or bench 14. The casing 13 is provided, adjacent the bottom thereof, with a plurality of forwardly projecting substantially horizontal pins 15 upon which the glass sheet 11 constituting the lighted background is supported at its lower edge and also upon which the glass sheet 10 to be colored is likewise supported, the said sheet 10 preferably lying flat against the glass background 11.

While the invention is not limited to the use of any particular type of coloring material, the coloring material preferably used consists of a frit enamel formed of vitrifiable material including as one of its components pulverized or powdered glass suspended in a liquid vehicle to form a solution of the desired consistency. The glass used in making the enamel is preferably of lead boro-silicate or lead borate glass although other types of glass of equally low fusing temperature may be employed. The liquid vehicle may consist of a highly volatile composition such as a mixture of alcohol and water. The glass frit is finely ground, such as in a ball mill, and is preferably sufficiently fine to pass through a 200 mesh screen.

The enamel solution containing the vitrifiable colors can be applied to the glass sheet 10 in any desired manner such as by spraying the same thereon with an ordinary spray gun 16 (Fig. 2).

In order to facilitate the application of the enamel upon the glass to form the desired lettering, design, or pattern, a cut-out stencil 17 is employed and is laid against the outer surface of the glass sheet 10. By way of example, the stencil 17 in the drawing has cut therefrom, as indicated at 18, the letter "E", and it will of course be understood that the cut-out portions of the stencil will correspond to the lettering, design, or pattern which it is desired to apply to the glass. The stencil 17 is preferably formed of a sheet of relatively soft, flexible rubber and is adapted to cover the entire surface of the glass sheet except for the cut-out portions 18. The stencil may be removably attached to the glass sheet by means of a plurality of relatively small suction cups 19 carried thereby.

When coloring the glass sheet 10, a stencil 17 having the desired cut-out portions 18 is first secured thereto, after which the first coat of coloring enamel is adapted to be applied to those portions of the sheet which are exposed by the cut-out portions of the stencil, and this is preferably effected by spraying the enamel solution thereon as shown in Fig. 2. This coating of enamel is then permitted to dry, after which a temporary protective coating is applied to the glass sheet directly upon the enamel forming the lettering, design or pattern. The protective coating is preferably applied to the glass sheet by means of an ordinary spray gun, although other methods of application may be followed and the said coating is adapted to be of such character that it can be readily removed from the glass after the enamel has been baked or fired thereon. While various types of protective coatings may be used, I prefer a mixture of ground chalk, alcohol, and water in suitable proportions. Such a mixture is commonly known as whiting, and, by way of example, the alcohol and water may be used in equal proportions with about one gallon of liquid to two quarts of ground chalk, although these relative amounts may be varied as desired.

The protective coating of whiting is then allowed to dry, after which the stencil 17 is removed from the glass sheet and the second coloring enamel forming the background of the sign then applied thereto by spraying or the like. The coloring enamel forming the background may be the same type enamel as is used in forming the lettering, design, or pattern, although naturally of a contrasting color. In spraying the background enamel upon the glass, the operator can move the spray gun slowly back and forth over the entire sheet, including the lettering, design, or pattern if desired, and this operation is continued until a coat of the desired thickness has been built up upon the glass. In other words, due to the provision of the temporary protective coating covering the enamel forming the lettering, design, or pattern, it is not necessary for the operator to keep the enamel forming the background from being applied upon the lettering, design, or pattern, since it will not contact directly therewith but instead will adhere to the temporary protective coating.

After the enamel forming the background has been applied to the glass sheet, the two coats of enamel are adapted to be baked or fired upon the glass, and this may be accomplished by passing the sheet horizontally through a baking or firing oven or leer 20 (Fig. 3), wherein the said sheet is supported and carried forwardly upon a series of horizontally aligned conveyor rolls 21, with the coated surface 22 of the sheet facing upwardly. During the travel of the sheet through the oven or leer, it is subjected to a sufficiently high temperature to cause the coloring enamel to be fired or baked upon the glass so as to become, in effect, an integral part thereof. The oven or leer 20 can be heated in any desired manner such as by means of a plurality of electrical heating elements 23.

I have found that when using a temporary protective coating of whiting, the said coating does not become adherent to the enamel upon which it is applied during the firing of the enamel on the glass, nor does it in any way interfere with the proper baking of the enamel. Consequently, after the firing operation, the temporary protective coating can be readily removed from the glass and such removal will of course remove with it all of the enamel which may have been applied thereto during the application of the second enamel coat to form the background. The removal of the temporary protective coating can be effected in any suitable manner, such as by passing the sheet, upon leaving the oven 20, over a plurality of conveyor rolls 24 and beneath one or a plurality of rotary washing brushes 25 supplied with water or other cleaning fluid from a perforated supply pipe 26.

From the above, it will be readily seen that according to the present invention, only a single heat treatment is required to finish a multicolored sign, design, or pattern, whereas heretofore a multicolored sign or any two or three color enamel job required two and sometimes three heat treatments. The advantages of using the rubber stencils 17 is that they can be easily and quickly attached to and peeled from the glass sheet 10 after the coloring enamel and temporary protective coating have been applied.

If desired, the coated glass sheet can be tempered by heating the sheet during the firing of the enamel thereon to approximately the point of softening of the glass and in then suddenly chilling the same to place the outer surfaces of the sheet under compression and its interior under tension. Any well known method and apparatus can be employed for tempering the glass sheet, such as for example that disclosed in Patent 2,068,746, issued January 26, 1937. Simultaneous with the heating of the glass preliminary to cooling, the coloring enamel will be fired thereon so that it becomes, in effect, an integral part thereof, rendering it of great permanency and durability. Contrary to what might be expected, neither the enamel nor the temporary protective coating upon the glass sheet has any effect whatever upon the normal tempering operations, nor do they in any way change or modify the breaking pattern of the glass. Further, it is not necessary to in any way alter the time and temperature cycle for tempering the glass to compensate for the presence of these coatings. Moreover, the protective coating will not become adherent to the glass during the heating thereof so that its temporary character is not impaired. On the other hand, it can be readily washed or cleaned from the glass sheet after tempering as explained above.

When tempering the glass sheet, the enamel used is of such composition and of such character that the time and temperature required for properly firing the same upon the glass will be the same as the time and temperature required for heating the sheet preliminary to cooling. Further, the enamel is preferably of such composition and of such character that after being fired upon the glass, it possesses the same coefficient of expansion and contraction as the glass. By employing an enamel of this type, the tempering and coloring operations can be performed simultaneously without either adversely affecting or in any way proving detrimental to the other. Also, due to the fact that the enamel and glass have the same coefficient of expansion and contraction, the liability of the enamel separating from the glass during the varying temperature conditions to which it is subjected when in use will be eliminated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In the manufacture of multicolored vitreous articles, the method consisting in first applying a coating of coloring material to the surface of the vitreous article to form the desired lettering, design or pattern, then covering the coloring material forming said lettering, design or pattern with a temporary protective coating, then applying a second coloring material to the uncolored portion of the article to form the background, heating the article to fire the two coats of coloring material thereon, and finally removing the temporary protective coating from the coloring material forming said lettering, design or pattern.

2. In the manufacture of multicolored vitreous articles, the method consisting in first applying a coating of coloring material to the surface of the vitreous article to form the desired lettering, design or pattern, then covering the coloring material forming said lettering, design or pattern with a temporary protective coating of whiting, then applying a second coloring material to the uncolored portion of the article to form the background, heating the article to simultaneously fire the two coats of coloring material thereon, and finally cleaning the temporary protective coating of whiting from the coloring material forming said lettering, design or pattern.

3. In the manufacturing of multicolored glass sheets, the method consisting in first attaching to the surface of the sheet to be colored a stencil having cut-out portions forming the desired lettering, design or pattern, applying a coating of coloring material to those portions of the sheet exposed by the cut-out portions of said stencil, then covering the coloring material forming said lettering, design or pattern with a temporary protective coating, removing the stencil from the sheet, then applying a second coloring material to the uncolored portions of the sheet to form the background, heating the sheet to fire the two coats of coloring material thereon, and finally removing the temporary protective coating from the coloring material forming said lettering, design or pattern.

4. In the manufacture of multicolored glass sheets, the method consisting in first attaching to the surface of the sheet to be colored a stencil having cut-out portions forming the desired lettering, design or pattern, applying a coating of coloring material to those portions of the sheet exposed by the cut-out portions of said stencil, then covering the coloring material forming said lettering, design or pattern with a temporary protective coating of whiting, removing the stencil from the sheet, then applying a second coloring material to the uncolored portions of the sheet to form the background, heating the sheet to simultaneously fire the two coats of coloring material thereon, and finally cleaning the temporary protective coating from the coloring material forming said lettering, design or pattern.

5. In the manufacture of multicolored glass sheets, the method consisting in first applying a coating of coloring material to the surface of the sheet to form the desired lettering, design, or pattern, then covering the coloring material forming said lettering, design, or pattern with a temporary protective coating, then applying a second coloring material over the entire surface of the sheet including the temporary protective coating to form the background, heating the sheet to simultaneously fire the two coats of coloring material thereon, and finally removing the temporary protective coating from the coloring material forming said lettering, design, or pattern.

6. In the manufacture of multicolored glass sheets, the method consisting in first spraying a coating of coloring material upon the surface of the sheet to form the desired lettering, design, or pattern, then spraying upon the coloring material forming said lettering, design, or pattern a temporary protective coating, then spraying a second coloring material upon the uncolored portions of the sheet to form the background, heating the sheet to simultaneously fuse the two coats of coloring material thereon, and finally removing the temporary protective coating from the coloring material forming said lettering, design, or pattern.

7. In the manufacture of multicolored glass sheets, the method consisting in first attaching to the surface of the sheet to be colored a stencil having cut-out portions forming the desired lettering, design, or pattern, spraying a coating of coloring material upon those portions of the sheet exposed by the cut-out portions of said stencil, then spraying upon the coloring material forming said lettering, design, or pattern a temporary protective coating, removing the stencil from the sheet, then spraying a second coloring material upon the uncolored portions of the sheet to form the background, heating the sheet to simultaneously fuse the two coats of coloring material thereon, and finally removing the temporary protective coating from the coloring material forming said lettering, design, or pattern.

GERALD WHITE.